April 25, 1967  W. R. MEIER  3,315,883

METHOD OF AND APPARATUS FOR COLLECTING HONEY

Filed Oct. 4, 1966

INVENTOR
WALTER R. MEIER

BY Dodge and Sons

ATTORNEYS

United States Patent Office 3,315,883
Patented Apr. 25, 1967

3,315,883
METHOD OF AND APPARATUS FOR
COLLECTING HONEY
Walter R. Meier, 143 S. Rose Lane,
Columbus, Nebr. 68601
Filed Oct. 4, 1966, Ser. No. 584,270
9 Claims. (Cl. 233—11)

This application is a continuation-in-part of my application Ser. No. 306,219, filed Sept. 3, 1963, and now abandoned.

This invention relates to a method of and appartus for separation of wax and honey.

In the removal of honey from the comb, it is customary practice to slide off the thin wax layer which overlies the face of the comb. The honey may then be extracted from the comb. The removed thin wax layer is known in the art as "cappings." These cappings contain beeswax, honey and a material commonly referred to as "slumgum" which consists of dead bees, larvae, cocoons, pollen, etc. The industry has for years sought a way to separate and recover both the honey and the beeswax from cappings. Because the three materials have different specific gravities, separation in the past has been carried out in settling tanks and in centrifuges. Complete separation is not achieved in this way and it is still necessary as a final step to heat the wax, slumgum and honey mixture to the melting point of the wax. The molten wax and honey and slumgum will then separate quite completely under gravity, but the honey recovered by this type of separation is darkened by the heat required to melt the wax. The darkened honey is salable only at a discount.

According to the present invention, a mixture of honey and cappings is passed through a separator, which may be of either the gravity or centrifugal type, to effect partial separation of the constituents and to form a cappings-rich layer that floats on a honey layer. The floating layer is then moved toward a collection station along a path that includes a baffle over which the layer must flow and in the region of which a narrow band of the layer is heated sufficiently to melt the wax. The previously upseparated honey in the floating mass is thus released and flows down along the inlet side of the baffle into the pool of honey on which the cappings are floating. The molten wax and entrained slumgum flow over the baffle and across an apron into a heated gravity separator. There molten wax and slumgum are separated by gravity. The wax having the lower specific gravity is collected by flow across an overflow weir, while the slumgum is drained off at the bottom. If desired, the slumgum as it leaves the separator may be pressed to effect removal of any wax entrained in the drained slumgum.

It has been found that the separation is improved somewhat and that the cappings and honey mixture flows better through the apparatus if it is first preheated to a temperature in the range of from 95° F. to 105° F. This temperature range is well below the melting point of beeswax.

The heat darkening of honey is avoided in the practice of this invention. This result is believed to be attributable to the localized heating of the cappings and to the continuous, immediate removal of the molten wax. It appears also that as the cappings flow toward the heat source and the baffle much of the honey is released and separates by gravity before the melting temperature of the wax is reached.

The invention will be described having reference to the accompanying drawing in which.

Figure 1:
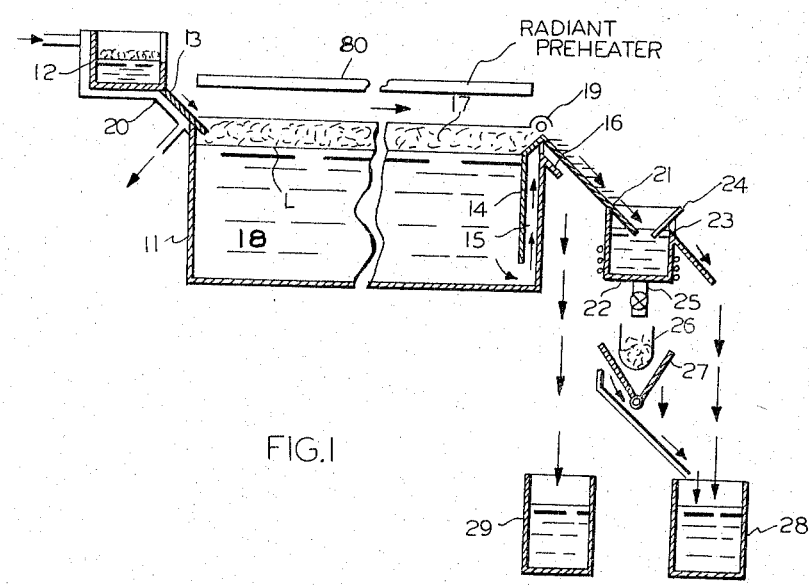
FIG. 1 is a schematic showing of a gravity separator for carrying out the invention.

Refer first to FIG. 1. The separating device includes a collection device or trough 11 into which honey and cappings are introduced from distributor 12. An inclined apron 13 connects the distributor 12 with trough 11 and has a width substantially equal to that of trough 11. A baffle plate 14 is provided at the exit end of trough 11. The channel 15 between the baffle and the end wall of the trough provides a passage through which honey flows as it overflows outlet weir 16. Weir 16 maintains the honey surface at a level L. The upper inclined surface of baffle 14 serves as a barrier surface which intercepts the floating layer of cappings 17 which forms on the flowing honey 18. A radiant heat source 19 extends the full width of and is located in the immediate vicinity of baffle 14. This causes the wax in the cappings to melt, but only in the vicinity of the baffle 14. A discharge apron 21 extends from baffle 14 above the weir 16 to a heated collection vessel 22. Vessel 22 has an overflow weir 23 and a skimmer 24. A valved outlet 25 extends from the bottom of vessel 22. Slumgum passing through outlet 25 is collected in a bag 26. Press means 27 may be provided if desired to effect removal of any wax passing through outlet 25. Molten wax passes over weir 23 and is collected in container 28. Honey is collected in tank 29.

Figure 2:
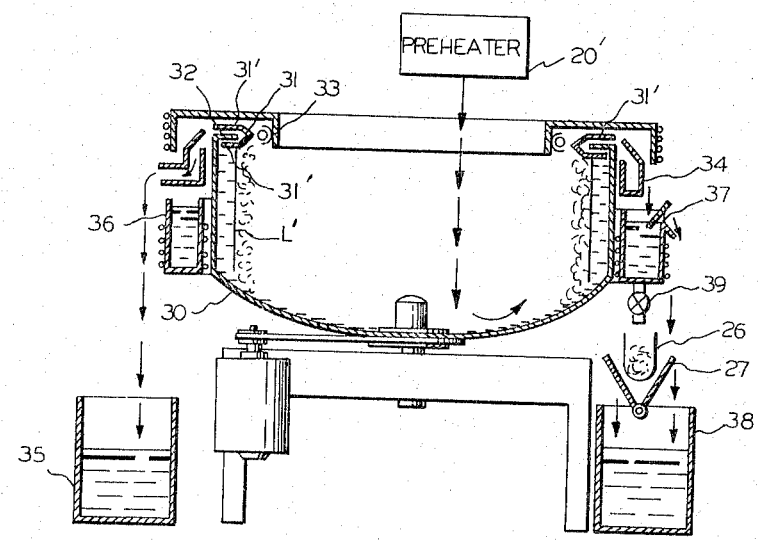
FIG. 2 is a schematic showing of a centrifugal separator embodying the present invention.

The embodiment shown in FIG. 2 comprises a rotary centrifugal separator drum 30. An annular baffle 31 is located adjacent the upper edge of the drum 30. Baffle 31 is attached to and rotates with the drum 30. A weir 32 extends inward from the uppermost edge of drum 30 and lies between the legs 31' of baffle 31. Weir 32 maintains the surface of the honey at L'. A radiant heat source 33 is located adjacent the baffle 31. Honey passes between the weir 32 and legs 31' of the baffle into an annular launder 34 from which it flows into a tank 35. Slumgum and melted wax pass over baffle 31 into an annular launder 36 which is heated. Molten wax overflows a weir 37 formed in the side wall of launder 36 and is collected in container 38. Slumgum settles to the bottom of launder 36 and may be tapped off through valved outlet 39. As in the FIG. 1 embodiment, the slumgum may be collected in a bag 26 and run through a press or wringer 27 to remove additional amounts of wax.

Both embodiments of the invention perform the same method of separation. In each a flowing layer of honey is formed whose depth is controlled by a weir. Adjacent the weir is a baffle which serves as a barrier to intercept the capping layer which forms on the honey because of its low specific gravity. A radiant heat source melts a narrow band of the capping layer as it approaches the crest of the baffle of either embodiment. As the capping layer approaches the baffle and as its temperature approaches that of the melting point of the wax, the adhesive forces retaining honey in the cappings are lessened and honey in the capping layer will tend to gravitate into the honey layer on which the cappings are floating. The molten wax as it passes over the crest of the baffle will entrain the slumgum and both of these constituents will flow over the baffle into a collection vessel. The wax and slumgum in this vessel is maintained quiescent and at a temperature high enough to insure that the wax will remain molten. The slumgum, having a higher specific gravity than the wax, will settle to the bottom. As continued amounts of these materials accumulate the molten wax will overflow a weir in the vessel and will pass to a collection container. A valved outlet in the bottom of the vessel may be opened periodically so that the slumgum can be tapped off. As has been pointed out above, the slumgum is preferably collected in a porous bag and passed through a press or wringer to remove any wax not separated from it during the gravity separation step. Honey is removed from the main separation vessel continuously during the time that wax and slumgum pass out over the heated baffle. Automatic controls may be provided to maintain a desired heat level in the materials as they are being processed.

As shown in FIG. 1 the distributor 12 may be heated. For example, it may be provided with a hot water jacket 20. The trough 11 is provided with an overlying radiant heater 80. The heaters 20 and 80 are intended to preheat the honey and cappings mixture to a temperature somewhat below the melting point of the wax. A temperature in the range from 95° F. to 105° F. has been found suitable, but somewhat higher temperatures might be employed as beeswax has a melting point of about 143° F. to 147° F. Care must be taken to control the preheating in such a way that the wax is not melted except by the heater 19 and in the immediate vicinity of the baffle 14. The FIG. 2 embodiment may also be supplied with a preheated mixture of honey and cappings. The precise construction of the preheater 20' is not significant and various acceptable heaters will suggest themselves to those skilled in the art.

Practice of the method disclosed in this invention is not confined to the use of either of the two illustrated forms of apparatus. It will also be apparent that the precise form of the apparatus shown in the two illustrated embodiments is not essential to the invention. The scope of the invention is intended to be measured by the appended claims and no limitation to the illustrated embodiments is implied other than those which may be expressed in the claims.

What I claim is:
1. The method of recovering honey from a mixture of honey, beeswax and slumgum which consists in:
   (a) producing a floating layer of the mixture on a layer of honey;
   (b) forming a barrier to movement of the floating layer;
   (c) urging said floating layer toward said barrier;
   (d) heating the layer, only in the region of said barrier and only to a temperature sufficient to melt said wax, whereby the honey in said mixture is released and separates from said floating layer;
   (e) removing molten wax and entrained slumgum; and
   (f) removing honey from the layer of honey.
2. The method defined in claim 1 in which the heating is radiant.
3. The method defined in claim 1 including the step of preheating the mixture to a temperature below the melting point of beeswax as it approaches said barrier.
4. The method defined in claim 3 in which said temperature is in the range between 95° F. and 105° F.
5. Apparatus for recovering honey from a mixture of honey, beeswax and slumgum comprising:
   (a) means forming a flowing body of said mixture;
   (b) a barrier extending across said body of mixture and serving to intercept the buoyant layer of beeswax and slumgum as it forms thereon;
   (c) heating means adjacent said barrier and arranged to melt only a band of the beeswax adjacent said barrier;
   (d) means collecting the molten wax and entrained slumgum overflowing said barrier; and
   (e) means collecting honey from beneath said buoyant layer.
6. The combination defined in claim 5 in which
   (a) the first mentioned means is a centrifuge drum; and
   (b) the barrier is an annular baffle adjacent the open end of said drum.
7. The combination defined in claim 6 in which
   (a) said baffle comprises an annular crest and flanges extending radially outward from said crest; and
   (b) an annular weir extending radially inward from an outlet edge of said drum between the baffle flanges, the honey passing from said drum by flowing under said baffle and over said weir.
8. The combination defined in claim 5 in which the first mentioned means comprises:
   (a) a trough; and
   (b) means for continuously introducing a mixture of honey, beeswax and slumgum into said trough.
9. The combination defined in claim 5 and
   (a) gravity separating means for separating the collected molten wax and slumgum.

References Cited by the Examiner

UNITED STATES PATENTS

| | | | |
|---|---|---|---|
| 1,525,808 | 2/1925 | Hall | 233—11 |
| 1,649,095 | 11/1927 | Brewster | 233—11 |
| 2,111,748 | 3/1938 | Brand | 210—187 |
| 2,520,304 | 8/1950 | Brand | 210—187 |
| 2,921,969 | 1/1960 | Loy | 233—11 |
| 3,217,979 | 11/1965 | Cook | 233—7 |

M. CARY NELSON, *Primary Examiner.*